UNITED STATES PATENT OFFICE.

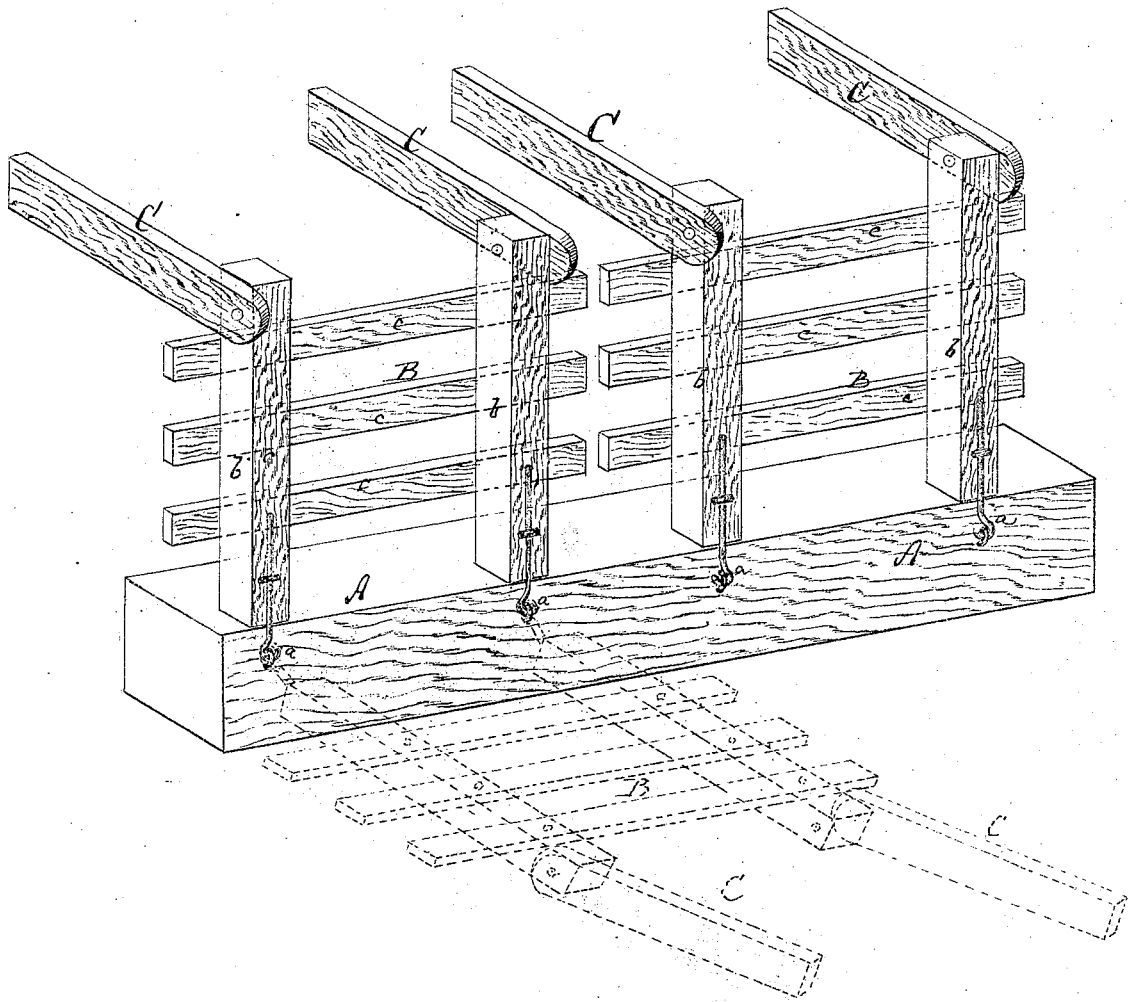

WILLIAM PENN HUBBARD, OF FARMLAND, INDIANA, ASSIGNOR TO HIMSELF AND JAMES H. FEGANS, OF SAME PLACE.

IMPROVEMENT IN WATER-GATES.

Specification forming part of Letters Patent No. 117,781, dated August 8, 1871.

*To all whom it may concern:*

Be it known that I, WILLIAM PENN HUBBARD, of Farmland, in the county of Randolph and State of Indiana, have invented a new and Improved Flood-Gate; and I do hereby declare that the following is a full, clear, and exact description thereof, which will enable others skilled in the art to make and use the same, reference being had to the accompanying drawing forming part of this specification, which represents a perspective view of my improved flood-gate.

The object of this invention is to produce a durable and reliable fence or gate to be put up across streams, rivers, creeks, and low grounds which are subject to overflow. The invention consists in constructing the fence or gate of sections which are hinged to a stationary sill, and in providing the same with pivoted arms which sustain them in the erect position, and, in case of a flood, serve to hold them down upon the bottom.

A in the drawing represents a stationary sill extending across the bottom of a stream or creek, its ends firmly secured by abutments placed on the sill. To that side of the sill which faces down stream are hinged the downward extensions $a$ $a$ of the fence-posts $b$ $b$, suitable horizontal rails $c$ $c$ connecting said posts to complete the fence B. The latter is thus, in sections of suitable length, hinged to the sill so that it will stand erect thereon when in position, while it can swing down upon the bottom of the stream below the level of the sill during a flood. To the upper ends of the posts $b$ are pivoted wooden bars or levers C C, which, when the fence is erect, rest on the upper rails, and thereby serve to retain the sections in an upright position, while, when in a flood, the fence is thrown down, as shown by dotted lines, they will be swung out and rest on the bottom, helping thereby to keep the sections down. The sections are easily placed upright again after the water has fallen by swinging them up, the bars C meanwhile bracing or propping them by standing inclined on the bottom. When the sections are quite erect the bars C are swung up stream again over the top rails to use the latter for fulcrums, and thereby retain the fence in position.

Having thus described my invention, I claim as new and desire to secure by Letters Patent—

The flood-gate or fence, pivoted in sections to the down-stream side of a sill, A, and provided with the pivoted bars C, which serve as levers for holding the sections upright and as floats on the water, as set forth.

WILLIAM PENN HUBBARD.

Witnesses:
ADAM GETZ,
JAMES C. BATES.